3,020,270
CATALYSIS OF PHOSPHOSULFURIZATION REACTIONS

John A. Brown, Metuchen, N.J., assignor to Esso Research and Engineering Company, a corporation of Delaware
No Drawing. Filed May 13, 1958, Ser. No. 734,820
8 Claims. (Cl. 260—139)

This invention is concerned with the phosphosulfurization of hydrocarbons to obtain additives that impart detergency, extreme pressure, oxidation resistance, and other properties to lubricants, fuel oils, and similar oleaginous materials. More particularly, this invention is concerned with an improved process for the phosphosulfurization of hydrocarbons wherein the reaction is catalyzed by trace amounts of oxygen acids of phosphorus. The use of an oxygen acid of phosphorus as a catalyst in the phosphosulfurization reaction of this invention greatly reduces the reaction time, materially improves the appearance of the final product, and avoids formation of sediment. In many instances, sediment-free, clear products cannot be obtained without catalysis in the manner of this invention.

In brief compass, this invention proposes an improvement of a process wherein phosphorus pentasulfide is reacted with a hydrocarbon material, preferably one having a molecular weight in the range of 500 to 100,000 at a temperature in the range of 350° to 600° F., to obtain a product useful as a lubricant additive as such, or as an intermediate, containing at least 2 weight percent, preferably 3 to 4 weight percent of combined phosphorus and at least 4 weight percent, preferably 5 to 6 weight percent of combined sulfur. The improvement of this invention comprises catalyzing the reaction between the phosphorus pentasulfide and hydrocarbon material by the addition to the reaction mixture of in the range of 0.01 to 0.1 weight percent of an oxygen acid of phosphorus whereby the reaction rate is substantially increased.

It is known to phosphosulfurize hydrocarbons and petroleum fractions to obtain additive materials useful in lubricants to improve specific properties of the lubricants such as oxidation resistance. Such phosphosulfurized materials can also be reacted with other materials to form more complex lubricating oil additives. This invention is based on the discovery that the reaction time of a phosphosulfurization reaction, when using phosphorus pentasulfide, can be materially decreased by as much as 50% or more through the use of almost trace amounts of oxygen acids of phosphorus, e.g., $HPO_3$. Not only is the reaction rate materially increased, but the appearance and quality of the product are usually enhanced. It is an important concept of this invention to use only trace or minute amounts of the catalyst in the range of 0.01 to 0.1 weight percent as acid, based on the combined reaction mixture. Larger amounts of the catalyst, while being no more effective, appear in and might undesirably influence the character of the final product. According to this invention, the treatment of hydrocarbons with phosphorus pentasulfide on a commercial scale, i.e., using more than 1000 pounds of reactants, can be completed in 3 to 8 hours at 425° F., which is a considerably lesser period of time than that obtained with processes known to the prior art.

While broadly any hydrocarbon material, e.g., paraffin waxes, can be subjected to phosphosulfurization in the manner of this invention, there are two primary feed stocks that are of interest: $C_2$ to $C_{10}$ monoolefin polymers having a molecular weight in the range of 500 to 100,000 and petroleum bright stocks boiling above 700° F. abs. obtained as residues in the distillation of asphalt-free or deasphalted crudes.

The monoolefin polymers useful in this invention are exemplified by polyethylene, polypropylene and polyisobutylene. It is intended to include, besides homopolymers, copolymers of monoolefins with other olefins such as isoprene, and with other materials such as styrene and similar vinyl compounds. The preferred polymers used have a molecular weight in the range of 700 to 2,500, and are freely soluble in heptane at 70° F. Polyisobutylene is particularly preferred.

The petroleum bright stocks useful in this invention are obtained by topping crude oils and extracting, or in some cases deasphalting, the residues to obtain materials having viscosities above 100 SUS at 210° F., viscosity indices above 80, and initial boiling points above 700° F. abs. Suitable crude oils are Pennsylvania and Mid-Continent. Bright stocks can also be obtained from catalytic cracking cycle stocks. Such bright stocks useful for phosphosulfurization are recognized products of petroleum refining and need no further definition.

Phosphorus pentasulfide is used as the phosphosulfiding agent of this invention. It is not equivalent to other phosphorus sulfides such as phosphorus sesquisulfide for the treatment of hydrocarbons in the manner of this invention. While its purity is not too critical, it should meet the following standards:

| | |
|---|---|
| Phosphorus, wt. percent | 27.8 to 28.5. |
| Sulfur, wt. percent | 71.7 to 72.1. |
| Impurities, wt. percent | Less than 1%. |
| Pass 20 mesh screen | Ca. 85%. |
| M.P. | 275° C. min. |

The catalyst introduced into the reaction mixture can be obtained in several ways. The oxygen acid of phosphorus can, of course, be directly added to the reaction mixture or can be admixed with the phosphorus pentasulfide to form a co-mixture prior to the addition of the phosphorus pentasulfide to the reaction mixture. Suitable oxygen acids of phosphorus that can be used are $HPO_3$, $H_3PO_4$, $H_3P_2O_6$, and moist $P_2O_5$. While the formula for orthophosphoric acid given is $H_3PO_4$, it should be recognized that all such acids are in reality mixtures of several different types of compounds.

The requisite oxygen acid of phosphorus can also be obtained by pretreating the phosphorus pentasulfide with precursor materials that form, by reaction with the phosphorus pentasulfide, the desired oxygen acids. Such precursor materials can also be directly added to the reaction mixture wherein they react with the phosphorus pentasulfide to give the requisite oxygen acid of phosphorus. It is sufficient to have the requisite amount of the oxygen acid of phosphorus present at some time in the early stages of the reaction when the mixture is at an elevated reaction temperature above about 300° F. and preferably below about 380° F., i.e., the oxygen acid of phosphorus does not have to be initially present, but is not as effective if added after a major portion, i.e., more than 50%, of the reaction has occurred. Precursor materials that can be used to treat the $P_2S_5$ are water, $P_2O_5$, or any material which reacts with $P_2S_5$ to yield an oxygen acid of phosphorus. The phosphorus pentasulfide can be treated with 0.1 to 1.0 weight percent of the precursor material at a temperature in the range of 60° to 380° F. It is preferred to contact the $P_2S_5$ with water using in the range of 0.01 to 0.1 weight percent water. The use of water vapor in this connection is particularly preferred. This can be done at ambient temperature. It is believed that all of these materials are effective because they contribute hydrogen ions to the formation of the oxygen acids. Thus, while $P_2O_5$ is specified as a suitable material, it is believed that this is because it is associated with water.

Precursor materials that can be added to the reaction mixture to form the oxygen acid of phosphorus are the same as those listed above. They can be added in amounts in the range of 0.01 to 0.1 weight percent, based on total reaction mass.

The phosphosulfurization reaction is a straightforward one. Usually in the range of 10 to 20 weight percent of the phosphorus sulfide is reacted with the hydrocarbon material. Any suitable corrosion resistant reaction zone can be used, e.g., glass. The reaction temperature is in the range of 350° to 600° F., preferably 425° to 500° F. The reaction mass is preferably agitated. Pressure is not too material to the reaction, but it is preferably sufficient to prevent vaporization of the reactants, and will normally be under two atmospheres. It is much preferred to maintain an atmosphere devoid of free oxygen in the reaction zone. The reaction can be carried out, for example, under a blanket of nitrogen, carbon monoxide, refinery inert gas, or fuel gas. Preferably, the inert gas is used as a stripping gas during the reaction. The free oxygen content of the reaction mixture should not exceed trace amounts, e.g., under 0.1 weight percent, as any appreciable amount of free oxygen tends to cause obnoxious precipitate and discoloration of the product. Also, free water cannot be present during the reaction in any appreciable amount. More than catalytic amounts cause sulfur loss in the product and promote sediment formation. The free water content at any time during the reaction should not exceed 0.5 weight percent. On a commercial scale the catalyzed reaction is usually completed in under eight hours. The reaction is considered complete when a cooled sample at room temperature will remain bright for at least two hours. Usually such samples will remain bright indefinitely. By "bright" is meant that there is no phase separation and the product is free of haze and sediment.

The reaction product is useful as an additive without any further treatment, but will tend to evolve hydrogen sulfide. It can be further treated as by being stripped, extracted, diluted, etc. Particularly useful lubricating additives are formed by reacting the phosphosulfurized material with neutralizing agents to form more complex additives as is known in the art. For example, a polyisobutylene phosphosulfurized according to this invention is reacted at 300° F. with a stoichiometrically equivalent amount of a high alkalinity barium sulfonate to obtain an effective automotive engine lubricating oil detergent inhibitor additive.

EXAMPLE I

The test results given in Table I were obtained in the laboratory in the following manner:

1000 grams polybutene and 150 grams $P_2S_5$ were charged to a 2-liter flask at room temperature and heated to 300° F., under $N_2$ and with agitation. Catalyst when used was added at about 300° F., and the mixture was then heated to 425° F. and maintained at 425° F. until a cooled sample remainded bright and clear. The polybutene used was obtained by the Friedel-Crafts polymerization of isobutylene and had an average molecular weight of about 1100 (Staudinger), and a cryoscopic molecular weight range of 700 to 3000. It is sold by Amoco Chemical Company as Indopol H-300.

*Table I*

| Catalyst Used | Grade of $P_2S_5$ Used | | | |
|---|---|---|---|---|
| | Monsanto "Reactive" | Monsanto "Regular" | AAC Co. "Distilled" | AAC Co. "Green" |
| No Catalyst | 8-S | 14-B | 1.2-3.5-B | 10-S | 13-S |
| 0.08% $HPO_3$ | 1.75-B | | | 5.0-B |
| 0.05% $H_2O$ | 7.5-B | | | |
| 0.08% $P_2O_5$ | 5.0-B | 5.0-B | | 4.0-B |
| 0.08% $H_3PO_4$ | 3.5-B | | 7.0-B | |
| 0.7% $P_4S_4O_6$ | 7.5-S | 5.0-S | | |
| Reground in moist atmosphere | | | 4.0-B | |

Above numbers are hours required at 425° F. to complete reaction.
S="Sediment"—sample opaque.
B="Bright"—sample clear and transparent.

The two Monsanto products referred to are commercially available grades of $P_2S_5$ and were made in general by the direct combination of phosphorus and sulfur, followed by distillation. The "Regular" differs from the "Reactive" in that it is less reactive to alcohols, and the two grades may occasionally differ in reactivity to hydrocarbons. The AAC "Distilled" product referred to is sold by the American Agricultural Chemical Company. The AAC "Green" referred to was a special sample taken from the intermediate green-colored layer that forms between the thin yellow-colored layer that first crystallizes and the final yellow-colored solid center portion formed when the molten $P_2S_5$ is pan cooled. The "Green" sample is the least reactive of the phosphorus pentasulfides. The Monsanto products are greenish-yellow powders containing 27.8 to 28.5 weight percent phosphorus. They have melting points of 275° C. minimum. The AAC "Distilled" product has a phosphorus content of 28.06 weight percent and a sulfur content of 71.91%. It has a melting point of 278° C. and an apparent density (Scott volumeter) of 0.98.

In the above example, the indicated catalyst or catalyst precursor was added to the phosphorus pentasulfide-hydrocarbon mixture prior to any appreciable reaction. It can be seen that the catalyst greatly increases the reaction rate and leads to a bright and clear product. It is to be noted that the addition of $P_4S_4O_6$ had a deleterious effect, which is somewhat surprising. The AAC "Distilled" product, when it was found to be unsatisfactory, was reground in moist air to create oxygen acids of phosphorus therein, with the improved results as shown.

EXAMPLE II

The data presented in the following Table II were obtained by reacting 1500 pounds of the indicated phosphorus pentasulfide with 10,000 pounds of Indopol H-300 in a 2,000 gallon glass-lined Pfaudler kettle with associated heating and feed lines. The reaction was carried out at a temperature of 425–450° F. under a nitrogen atmosphere with agitation. The AAC Company "Distilled" product in the second run was treated according to this invention by being reground while exposed to the atmosphere which contains sufficient water or moisture to introduce the requisite amount of oxygen acid of phosphorus. In the third run, $HPO_3$ as such was added to the distilled product.

*Table II*

| $P_2S_5$ Used | Reaction Time—Appearance |
|---|---|
| AAC Co. "Distilled" | 10+ hours—heavy sediment. |
| Same, but ground (exposed to atmospheric $H_2O$) and re-distilled. | 4 hours—bright and clear. |
| AAC Co. "Distilled"+0.1% commercial $HPO_3$. | 7 hours—bright and clear. |

It can be seen that the introduction of water to the $P_2S_5$ to form an oxygen acid of phosphorus according to this invention materially reduces the reaction time in commercial production and enhances the obtainance of a bright and clear product.

This invention having been described, what is sought to be protected by Letters Patent is succinctly set forth in the following claims.

What is claimed is:

1. In a process wherein phosphorus pentasulfide is reacted with a hydrocarbon material selected from the group consisting of $C_2$–$C_{10}$ monoolefin polymers having a molecular weight in the range of 500–100,000 and petroleum bright stocks having viscosities above 100 SUS at 210° F., viscosity indices above 80 and initial boiling points above 700° F. abs., at a temperature in the range of 350° to 600° F., to obtain a product useful as a lubricant additive containing above 2 weight percent of combined phosphorus and above 4 weight percent of combined sulfur; an improved method of increasing the reaction rate and of enhancing the obtainance of a clear product free of sediment which comprises catalyzing the reaction between said phosphorus pentasulfide and hydrocarbon material by the addition to the reaction mixture of in the range of 0.01 to 0.1 weight percent of a catalyst selected from the group consisting of water, inorganic oxides of phosphorus and inorganic oxygen acids of phosphorus consisting of phosphorus, oxygen and hydrogen.

2. The process of claim 1 wherein said catalyst is added co-mixed with said phosphorus pentasulfide.

3. The process of claim 1 wherein said catalyst is selected from the group consisting of $HPO_3$ and $H_3PO_4$ and added as such to said phosphorus pentasulfide prior to the addition of the latter to said reaction mixture.

4. The process of claim 1 wherein in the range of 10 to 20 percent of said phosphorus pentasulfide, based on said hydrocarbon, is used, wherein the free oxygen content of said reaction mixture is maintained under 0.1 weight percent, and wherein the free water content of said reaction mixture is maintained under 0.5 weight percent.

5. The process of claim 4 wherein said hydrocarbon is a polybutene having a molecular weight in the range of 700 to 2500.

6. The process according to claim 1, wherein said catalyst is an inorganic oxygen acid of phosphorus.

7. The process according to claim 1, wherein said catalyst is an oxide of phosphorus.

8. The process according to claim 1, wherein said catalyst is water.

References Cited in the file of this patent

UNITED STATES PATENTS

| | | |
|---|---|---|
| 2,329,486 | Rummelsburg | Sept. 14, 1943 |
| 2,534,217 | Bartelson | Dec. 19, 1950 |
| 2,838,484 | Karll et al. | June 10, 1958 |